United States Patent [19]

Greeley

[11] 3,912,453
[45] Oct. 14, 1975

[54] METHOD OF DETERMINING THE ALKALI METAL HYDROXIDE CONCENTRATION IN AN AQUA-AMMONIA-CHROMATE SOLUTION FOR USE IN AN ABSORPTION REFRIGERATION SYSTEM

[75] Inventor: Edward M. Greeley, Syracuse, N.Y.
[73] Assignee: Carrier Corporation, Syracuse, N.Y.
[22] Filed: June 3, 1974
[21] Appl. No.: 475,740

[52] U.S. Cl................................. 23/230 R; 62/125
[51] Int. Cl.².......................................... G01N 31/16
[58] Field of Search.......... 23/230 R, 230 L; 62/125

[56] References Cited
UNITED STATES PATENTS
2,228,737   1/1941   Tandberg et al.................. 23/230 L
3,496,113   2/1970   Platte et al..................... 23/230 R X OTHER PUBLICATIONS
Analytical Abstracts Vol. 13, abstract No. 5493, Oct. 1966.

Primary Examiner—Morris O. Wolk
Assistant Examiner—Barry I. Hollander
Attorney, Agent, or Firm—J. Raymond Curtin; Frank N. Decker, Jr.

[57] ABSTRACT

A method of determining the sodium hydroxide concentration in an aqua-ammonia-chromate absorption solution comprising adding formaldehyde to the solution to react with the ammonia in solution, and then adding a quantity of phenolphthalein indicator and titrating the sodium hydroxide with an acid. The formaldehyde removes the ammonium ions from the solution, and the amount of acid required to neutralize the absorption solution indicates the amount of sodium hydroxide therein.

3 Claims, No Drawings

METHOD OF DETERMINING THE ALKALI METAL HYDROXIDE CONCENTRATION IN AN AQUA-AMMONIA-CHROMATE SOLUTION FOR USE IN AN ABSORPTION REFRIGERATION SYSTEM

BACKGROUND OF THE INVENTION

1. Field of the Invention

The present invention relates to the determination of the concentration of an alkaline solute in an ammonia solution, and in particular to the determination of the concentration of sodium hydroxide in an aqua-ammonia-chromate absorption refrigeration solution.

2. Description of the Prior Art

A refrigerant commonly used in absorption refrigeration systems is the aqua-ammonia-chromate absorption solution, which is a solution comprising approximately 20–40% ammonia, 3% sodium chromate, 0.1–1% sodium hydroxide, and the balance water. The ammonia solution serves as the refrigerant and the small amount of sodium hydroxide functions to keep the solution basic to inhibit corrosion of metal in the systems. In the absorption cycle, heat is added to a "weak solution" (which has a high concentration of ammonia) in a generator to vaporize the ammonia and drive it out of solution and into a condenser where it is liquefied. The generator is generally a steel tank which is subject to corrosion by excessive amounts of sodium hydroxide in the absorption solution. Therefore, the sodium chromate is included in the solution for oxidizing the interior surface iron of the generator to effect the creation of a protective iron oxide coating on the interior generator wall to resist the foregoing corrosive effects.

The sodium chromate, under some conditions, tends to break down or be reduced, and the supply thereof must be replenished from time to time to maintain the necessary corrosion resistance. Moreover, a result of this breakdown is the formation of potentially corrosive sodium hydroxide. It therefore is necessary to determine the concentration of sodium hydroxide in the solution from time to time. The measurement of the concentration of sodium hydroxide is normally a simple, conventional task wherein phenolphthalein is added to the solution, and the sodium hydroxide is titrated until the red color of the phenolphthalein disappears indicating the neutralization of the sodium hydroxide. The amount of acid so added is determinative of the concentration of the sodium hydroxide. However, this method does not work in the foregoing ammonia solution because the ammonia also reacts with the acid. It therefore is necessary to somehow remove the effect of the ammonia if the acid titration method is to be used.

Heretofore, it has been conventional to take a sample of the absorption solution and boil off the ammonia and thereafter perform the acid titration. Unfortunately, this process is not practicable because the absorption system to be tested is frequently incorporated in an air conditioning system where laboratory facilities are not available. Moreover, the individual testing the system, not being a chemist, might very well have difficulty administering the test. Hence, the present procedure of boiling off ammonia before adding the acid to the solution is cumbersome, dangerous, and generally inefficient to perform in the field.

SUMMARY OF THE INVENTION

An object of the present invention is to provide an improved method of determining the concentration of an alkaline solute in an ammonia solution.

A more specific object is to provide an improved method for determining the concentration of sodium hydroxide in an aqua-ammonia-chromate absorption solution.

Another object of the invention is to provide such a method which can be performed outside of a chemical laboratory at field installations by unskilled persons.

A further object of the invention is to provide a method of the foregoing type which is practicable, economical, safe and effective. Other objects will be apparent from the description to follow and from the appended claims.

The foregoing objects are achieved according to the preferred embodiment of the invention by the provision of a method of masking the presence of ammonia in an aqua-ammonia-chromate absorption refrigeration solution, and titrating the sodium hydroxide with an acid to determine the amount of sodium hydroxide in the solution. The masking of the ammonia in the solution is accomplished by adding paraformaldehyde thereto. The paraformaldehyde supplies formaldehyde which reacts with the ammonium hydroxide in the solution, causing the undesirable ammonium ions to disappear so that, for practical purposes, only sodium hydroxide remains to react with the acid.

DESCRIPTION OF THE PREFERRED EMBODIMENT

The inventive method described below provides a means for accurately determining the concentration of sodium hydroxide in an aqua-ammonia-chromate absorption refrigeration solution which can be performed by an unskilled individual outside of a laboratory. The various chemicals and pieces of equipment required can advantageously be supplied in the form of a kit which the individual can carry to a field location to perform this test.

Thus, in order to enable an absorption refrigeration system technician to field test such a system for the concentration of sodium hydroxide, a kit can be assembled which includes the reagents paraformaldehyde powder, phenolphthalein indicator solution (preferably 0.05 grams of reagent in 100 ml. of 50% ethanol solution), a standard acid such as 0.07N sulfuric acid, and distilled or deionized water. The equipment in the kit should include two glass bottles, each having about a 4-ounce capacity (one having 40 cc and 80 cc levels marked thereon), a measuring spoon for holding 2 grams of paraformaldehyde powder, a syringe assembly having a 1 cc plastic discharge tube, a 250 cc flask having 25 cc graduations, and several medicine droppers.

To perform the test, exactly 40 cc of distilled or deionized water is added to the marked 4-ounce bottle, and between 60 and 70 cc of absorption solution is slowly withdrawn from the refrigeration system and added directly into the other 4-ounce bottle. Absorption solution is next slowly poured from the latter bottle to the first bottle to exactly the 80 cc level. The bottle with the water-absorption solution is capped and shaken vigorously for 5 seconds.

A measuring spoonful of paraformaldehyde is then placed in the flask. The cap from the bottle holding the shaken mixture is removed and at least 1 cc of the mixture is withdrawn by the syringe assembly into the discharge tube thereof. One cc of the contents of the tube is then discharged into the flask holding the paraformaldehyde powder. The discharge tube of the syringe assembly preferably has spaced markings indicating a 1 cc volume, and liquid level in the tube should be determined at the point of tangency of the base of the miniscus of the liquid surface and the respective markings. The bottle with the remaining liquid mixture should be recapped.

The contents of the flask are now agitated until a uniform slurry is produced. About 25 cc of the distilled or deionized water is poured down the sides of the flask to wash all of the contents to the base thereof. The contents are swirled to obtain uniform mixture free of lumps. The foregoing steps remove any ammonium ions from the solution since the unwanted ammonium hydroxide reacts with formaldehyde supplied by the paraformaldehyde according to the following equation:

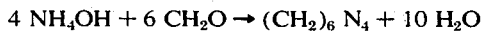

Exactly three drops of phenolphthalein solution are added to the flask. If no pink coloration is visible, the concentration of NaOH is less than 0.2%, and no correction thereof is necessary. If pink coloration is visible, the following steps must be performed without delay.

A medicine dropper is charged with the acid. Then, while holding the dropper in a vertical position, drops of acid are discharged one at a time into the flask as the flask contents are swirled. The drops so added are counted until the pink color just disappears or until 10 drops have been added — whichever occurs first. If the latter occurs, three more drops of phenolphthalein solution should be added and the process repeated. Care must be taken to maintain droplet size to obtain very accurate results.

The concentration of sodium hydroxide in the absorption solution can now be determined by multiplying the number of drops of acid added to the solution in the cylinder by a factor equal to the percentage of sodium hydroxide neutralized per drop of acid. Then, using the empirical relationship between the sodium chromate and sodium hydroxide in the absorption solution, the sodium chromate concentration can be determined. The individual performing the tests could make such determination from a chart or graph supplied to him. Each drop of acid added in the preceding embodiment has been found to indicate a 0.1% NaOH concentration, so that the product of the number of drops added until the pink color of the indicator solution disappears and 0.1% is the NaOH concentration.

The inventive method described above achieves each of the objects set forth. The test is easy to administer, and can be done safely and accurately outside of a laboratory by an unskilled person. The equipment and reagents can be supplied in a kit to facilitate the handling of these materials and the performance of the test.

The invention has been described in detail with particular reference to a preferred embodiment thereof, but it will be understood that variations and modifications can be effected within the spirit and scope of the invention.

I claim:

1. A method which is readily adapted for use by a serviceman at the machine site, of determining the alkali metal hydroxide concentration of the solution in an absorption refrigeration machine having an aqua ammonia solution therein, which comprises the steps of:

withdrawing a sample of the solution from the absorption refrigeration machine;

mixing together a measured quantity of the withdrawn solution with an acid indicator and with a quantity of formaldehyde which is at least sufficient for the formaldehyde to mask the presence of the ammonium ion present in the solution;

titrating the mixture with an acid of known concentration until the acid indicator indicates that the solution is neutralized, to determine the quantity of acid required to neutralize the mixture; and calculating the alkali metal hydroxide concentration of the solution from the quantity of acid determined to be required to neutralize the mixture.

2. The method according to claim 1 wherein the step of mixing the solution with formaldehyde comprises mixing the solution with paraformaldehyde powder.

3. The method according to claim 1 wherein the alkali metal hydroxide is sodium hydroxide and the solution contains a chromate compound as an inhibitor.

* * * * *